United States Patent
Lin

(10) Patent No.: US 8,417,269 B1
(45) Date of Patent: Apr. 9, 2013

(54) INTELLIGENT MESSAGING SYSTEM TO CONVERT EMAIL TO SMS, EMS AND MMS

(75) Inventor: Zhijian (Jeff) Lin, Dublin, CA (US)

(73) Assignee: Cellco Partnership, Basking Ridge, NJ (US)

(*) Notice: Subject to any disclaimer, the term of this patent is extended or adjusted under 35 U.S.C. 154(b) by 0 days.

(21) Appl. No.: 13/186,735

(22) Filed: Jul. 20, 2011

(51) Int. Cl.
*H04W 4/00* (2009.01)

(52) U.S. Cl. .............. 455/466; 455/412.1; 709/206; 709/238; 709/227

(58) Field of Classification Search .......... 455/450–460, 455/466, 418, 414.4, 550.1, 556.2, 432.2, 455/432.3, 552.1; 709/200, 230, 245
See application file for complete search history.

(56) References Cited

U.S. PATENT DOCUMENTS

2007/0255792 A1* 11/2007 Gronberg ............... 709/206
2007/0283039 A1* 12/2007 Kim et al. ............... 709/238

* cited by examiner

*Primary Examiner* — Rafael Pérez-Gutiérrez
*Assistant Examiner* — Keith Fang

(57) ABSTRACT

A method of sending a message to a mobile station using a common domain name includes the steps of receiving an email containing a subject and a body, combining the subject and the body into a first message, and determining if the email contains an attachment. If the email contains the attachment, the first message can be converted into a MMS message, and if not, a number of characters in the first message can be counted. If the number of characters is less than or equal to 160 characters, the first message can be converted to a SMS message. If the number is greater than 160 characters and less than or equal to 1000 characters, the first message can be converted to an EMS message. In addition, if the number of characters is greater than 1000 characters, the first message can be converted to the MMS message.

20 Claims, 7 Drawing Sheets

INTELLIGENT MESSAGING SYSTEM TO CONVERT EMAIL TO SMS, EMS AND MMS

TECHNICAL FIELD

The present subject matter relates to techniques and equipment to provide a single email domain for the various email domains for SMS and MMS messages and convert a message into an SMS, EMS, or MMS message, appropriately.

BACKGROUND

In recent years, as landline and mobile communication technologies have developed, digital messages have taken various types, such as emails, Short Messaging Service (SMS) messages, Enhanced Messaging Service (EMS) messages, and Multimedia Messaging Service (MMS) messages. Each message type has its own limitations. For example, a SMS message can typically only transmit 160 characters in each message. Further, the message cannot contain attachments or graphics. This type of message is the least expensive type of text message for the cellular telephone service to send through their network in terms of network resources and cost to the user. EMS messages are typically an extension of SMS messages. EMS messages allow small graphics, melodies, animations and long, formatted text (such as bold or italic) messages of approximately 1000 characters to be transmitted. The cost to transmit, in both resources and user cost, an EMS message is greater than that for a SMS message. An MMS message is similar to a standard e-mail in which it has no character limits and can transmit attachments. However, a MMS message is, out of the three listed above, the most expensive type of text message that can be sent over the wireless network, in terms of resources and cost to the user.

Currently, cellular network providers provide separate domains for each type of message. For example, Verizon Wireless has separate domains such that an email sent to the MDN@vtext.com address ("MDN" is the Mobile Directory Number of the mobile station being messaged) is converted into a SMS message. While an email sent to the MDN@vzwpix.com address is converted into a MMS message, which is delivered to the mobile station with the listed MDN. SMS messages and MMS messages are sent using different servers and protocols, which is the root of the separate domains.

However, it is inconvenient for the senders of email messages to remember different email domains in order to send different types of messages. When a sender uses the "wrong" email domain, errors can occur or messages can be truncated because the "wrong" message service is used. Examples are attempting to send a message with large attachments or that exceeds 160 characters as a SMS message. Also, the user can be charged a premium for a MMS message that could have been sent as a SMS message, based on character length. While the cellular network provider recovers a premium for the MMS message, the message is taking resources that it does not necessarily require, which may cause capacity issues with the provider's network.

Hence a need exists for simplifying the email domains to a single domain and add a method and device to determine the type of message that is sent and convert it accordingly.

SUMMARY

The teachings herein alleviate one or more of the above noted problems with the functionality to email a message to a mobile station using a single email domain name. An example uses a method to determine the message type for the mobile station. This method entails combining, at an intelligent messaging system, a subject of an email and a body of the email into a first message and determining if the email contains an attachment. If the email contains the attachment, the intelligent messaging system can convert the first message into a second message type. If the email does not contain the attachment, the first message can be converted into one of a third message type or a fourth message type. Also, each of the second, third and fourth message types differs from the others. In an alternate example, if the email does not contain the attachment, the first message can be analyzed to select into which of different types of messages to transform the first message, the second message type, a third message type or a fourth message type. The first message can then be transformed into the second, the third, or the fourth message type based on the analysis.

Another example of the method of converting the first message into one of the third or the fourth message types includes counting a number of characters in the first message. If the number of characters is less than or equal to a first limit, the first message is converted to the third message type. If the number of characters is greater than the first limit and less than or equal to a second limit, the first message is converted to the fourth message type. Additionally, if the number of characters is greater than the second limit, the first message is converted to the second message type.

Further examples of steps to the method are receiving the email at the intelligent messaging system using the single email domain name and transmitting one of the second, third, or fourth message types to the mobile station.

In other examples, an article of manufacture, can have at least one machine readable storage medium with programming instructions embodied thereon for execution by one or more computers. The programming can configure the one or more computers to be capable of performing functions for messaging services. The functions include combining a subject of an email and a body of the email into a first message and determining if the email contains an attachment. If the email contains the attachment, the first message can be converted into a second message type, and if the email does not contain the attachment, the first message can be converted into one of a third message type or a fourth message type. In an alternate example, if the email does not contain the attachment, the first message can be analyzed to select into which of different types of messages to transform the first message, the second message type, a third message type or a fourth message type. The first message can then be transformed into the second, the third, or the fourth message type based on the analysis.

The functions of the programming instructions converting the first message into one of the third or the fourth message types can also include the functions of counting a number of characters in the first message. If the number of characters is less than or equal to a first limit, the first message can be converted to the third message type. If the number of characters is greater than the first limit and less than or equal to a second limit, the first message can be converted to the fourth message type, and if the number of characters is greater than the second limit, the first message can be converted to the second message type.

As above, additional functions can include receiving the email at the intelligent messaging system using a single email domain name and transmitting one of the second, third, or fourth message types to the mobile station.

Further to the above examples, the second message type can have a Multimedia Message System (MMS) protocol, the third message type can have a Short Messaging Service (SMS) protocol, and the fourth message can have an Enhanced Messaging Service (EMS) protocol. Also, the second message type can be a MMS message, the third message type can be a SMS message, and the fourth message type can be an EMS message. Furthermore, the first limit can be between 140 and 160 characters, and the second limit can be approximately 1000 characters.

In an additional example, a method of sending a message to a mobile station using a common email domain name can include the steps of receiving, at the intelligent messaging system, an email containing a subject and a body and combining the subject and the body into a first message. The intelligent messaging system can also determine if the email contains an attachment. If the email contains the attachment, the first message can be converted into a Multimedia Message Service (MMS) message, and if the email does not contain the attachment, a number of characters in the first message can be counted. If the number of characters is less than or equal to 160 characters, the first message can be converted to a Short Messaging Service (SMS) message. If the number of characters is greater than 160 characters and less than or equal to 1000 characters, the first message can be converted to an Enhanced Messaging Service (EMS) message. In addition, if the number of characters is greater than 1000 characters, the first message can be converted to the MMS message. Then the MMS, SMS, or EMS message can be sent to the mobile station.

A yet further example is a method of delivering messages sent to a single email domain name that includes the steps of receiving, at the server, an email message. A selection is made, at the server, of one of several different types of messages, where each type of message differs from the other types of messages. The email message is transformed into the selected type of message, and the selected message type is transmitted to a desired mobile station through a message server dependent on the selected type of message.

Further to the example, the service can, optionally, receive an attachment to the email message, and if the attachment is received, select a first message type. However, if the attachment is not received, the number of characters in the email message are counted. If the number is over a first threshold, the first message type is selected. If the number is equal to or less then the first threshold and greater than a second threshold, a second message type is selected, and if the number is less than or equal to the second threshold, the first and second message types are eliminated.

Similar to the above, the first threshold can be approximately 1000 characters and the second threshold can be between 140 and 160 characters. Also, the first message type can be a MMS message, and the second message type can be an EMS message. Thus, the selection can be based solely on whether the email message contains an attachment and, if the attachment is not received, a number of characters in the email message. Additionally, the selection above can include the step of determining the selected message type based on certain factors. One of the factors can be a minimum amount of bandwidth required for transmitting the message, while fully delivering the selected type of message. Another factor can be a maximum amount of efficiency for transforming the message, while fully delivering the selected type of message.

As a result, the sender of the email only needs to remember a single domain name to send a message to a mobile station. Further, the cellular network provider can use his resources more efficiently, and the user receiving the message can get a properly formatted message at the most efficient price.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to using a common domain for all messaging to a mobile station, regardless of whether it is a SMS, EMS, or MMS message.

Figure 1:
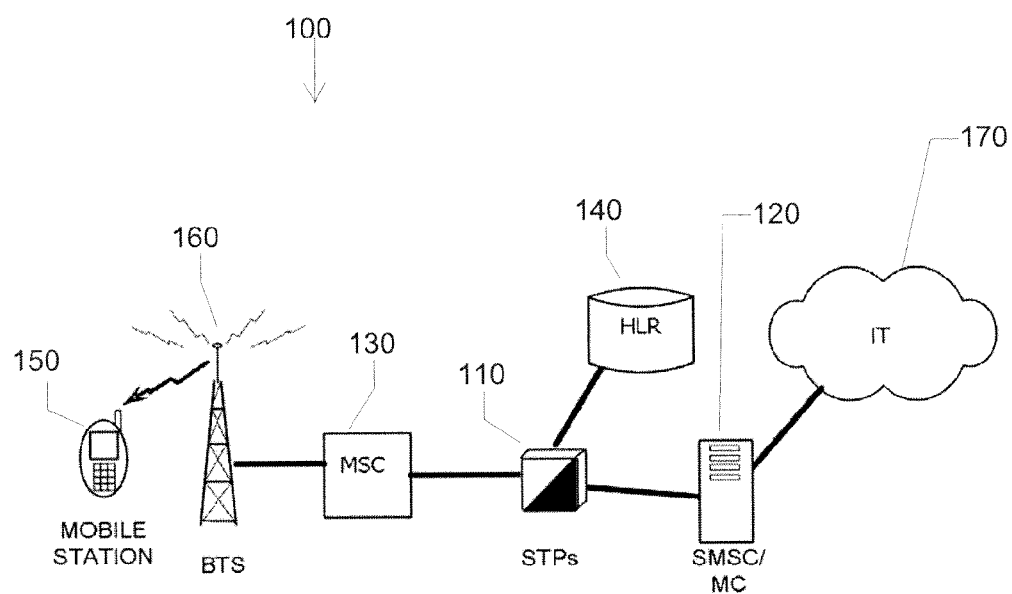
FIG. 1 is a functional block diagram that describes a various components of a mobile network used to implement a SMS message service.

Reference now is made in detail to the examples illustrated in the accompanying drawings and discussed below. FIG. 1 a block diagram of a number of wireless network components that are used to implement SMS messaging. As noted above, cellular network providers developed SMS to transmit text messages for display on mobile stations. In many existing network architectures, the SMS traffic uses the signaling portion of the network 100, through routers referred to as Signaling Transfer Points (STPs) 110. SMS traffic normally goes to/from a SMSC (Short Message Service Center) 120 which is one type of Message Center (MC). The STPs 110 provide communications between the SMSCs 120 and a mobile switching center (MSC) 130 as well as between the SMSCs 120 and a Home Location Register (HLR) 140.

An SMS message includes source and destination address fields. For messages from a user device, the source address is the mobile directory number (MDN) of the sending customer's mobile station or the email address of the sender. The destination address may be a MDN of a destination mobile station 150 or some other form of recognizable address. The HLR 140 stores a record associated with the destination mobile station's MDN for information about the mobile station 150 that is needed to route the message to the mobile station at its current location. The network then routes a SMS message with the MDN destination address all the way through to the addressed mobile station 150, wirelessly sent by a base transceiver system (BTS) 160 which communicates via an antennae system at the site of a base station. For SMS messages originating at a mobile station, a MSC determines where to route the message, typically to one of several SMSCs 120 deployed in the network 170 to then follow the path outlined above.

While the above outlines the procedure for handling a SMS message. An almost identical procedure is used to transmit an EMS message. EMS messages are handled using the SMSCs 120. For MMS messages, a Multimedia Message Service Center (MMSC) routes the MMS message to a Packet Data Serving Node (PDSN). The PDSN provides access to the Internet, intranets and application servers for the mobile station (discussed below).

Figure 2:
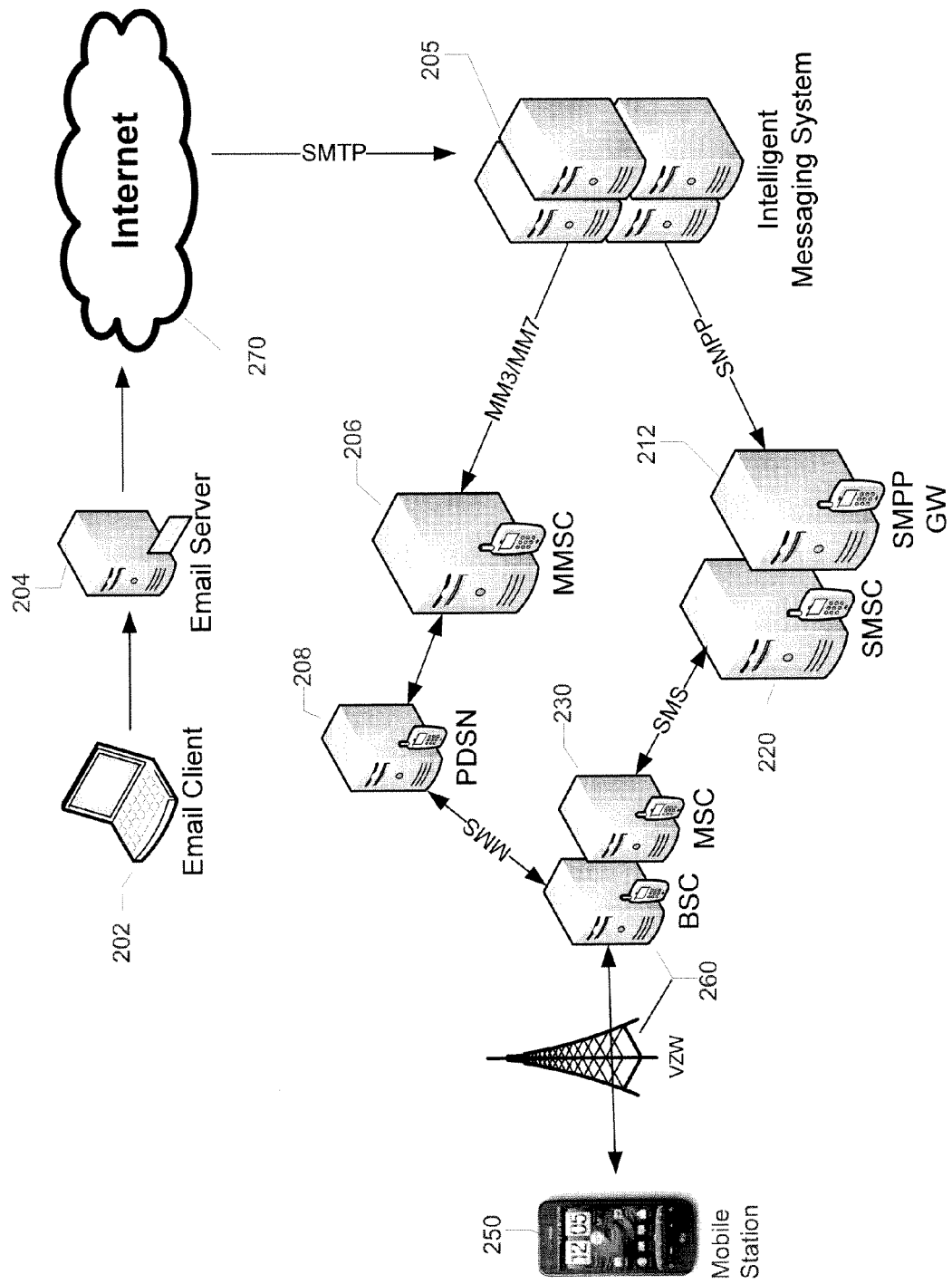
FIG. 2 is a functional block diagram that describes a various components of an example of a mobile network used to implement an example of an intelligent messaging system.

FIG. 2 illustrates a block diagram of an example of an intelligent messaging system routing a message. A user at a mobile station or other computer with an email client 202 prepares and sends an email message with a universal message domain (e.g. MDN@messaging.vzw.com) to a user's mobile station 250. The message is transmitted to an email server 204 and then transmitted over a network 270 (e.g. the Internet) and is ultimately received by an intelligent messaging system 205. The intelligent messaging system 205 processes the email, as explained below, and then routes it based on the processing. For emails determined to be a SMS or an EMS message, the email is sent to Short Message Peer-to-Peer (SMPP) Gateway (GW) 212 and SMSC 220. At the SMSC 220 the email is formatted accordingly as a SMS or an EMS message and then forwarded to the MSC 230 and the Base Station Controller (BSC) 260 to be delivered to the appropriate mobile station 250. Note that the BSC 260 can perform management functions for the BTS 160.

If the intelligent messaging system 205 determines that email is a MMS message, it transmits the email to the MMSC 206. The MMSC 206 processes the email accordingly and transmits the MMS message to the PDSN 208. The PDSN 208 transmits the MMS message to the MSC 230/BSC 260 to be delivered to the appropriate mobile station 250.

Further, FIG. 2 illustrates examples of the protocols used as the email message travels through the system to finally reach the mobile station 250. The email message can be transmitted over the Internet 270 to the intelligent messaging system 205 using the Simple Mail Transfer Protocol (SMTP). If the intelligent messaging system 205 determines that the email should be a SMS message, it transfers the email using the SMPP protocol. The SMSC 220 converts the email to a SMS message before forwarding it to the MSC 230. Traveling the MMS path, the intelligent messaging system 205 transmits the email to the MMSC 206 using the MM3 or MM7 protocols. The MM3 protocol is used to interface between the email server 204 using SMTP and the MMSC 206. The MM7 protocol is used to communicate with a value-added service provider (not illustrated) and the MMSC 206. The value-added service provider can be, for example, a bank sending a statement or an advertiser sending publicity, to include in the MMS message. The MMSC 206 communicates with the PDSN 208, who in turn communicates with the BSC 260/MSC 230 using the MMS message protocol to send the message to the mobile station 250.

Figure 3A:
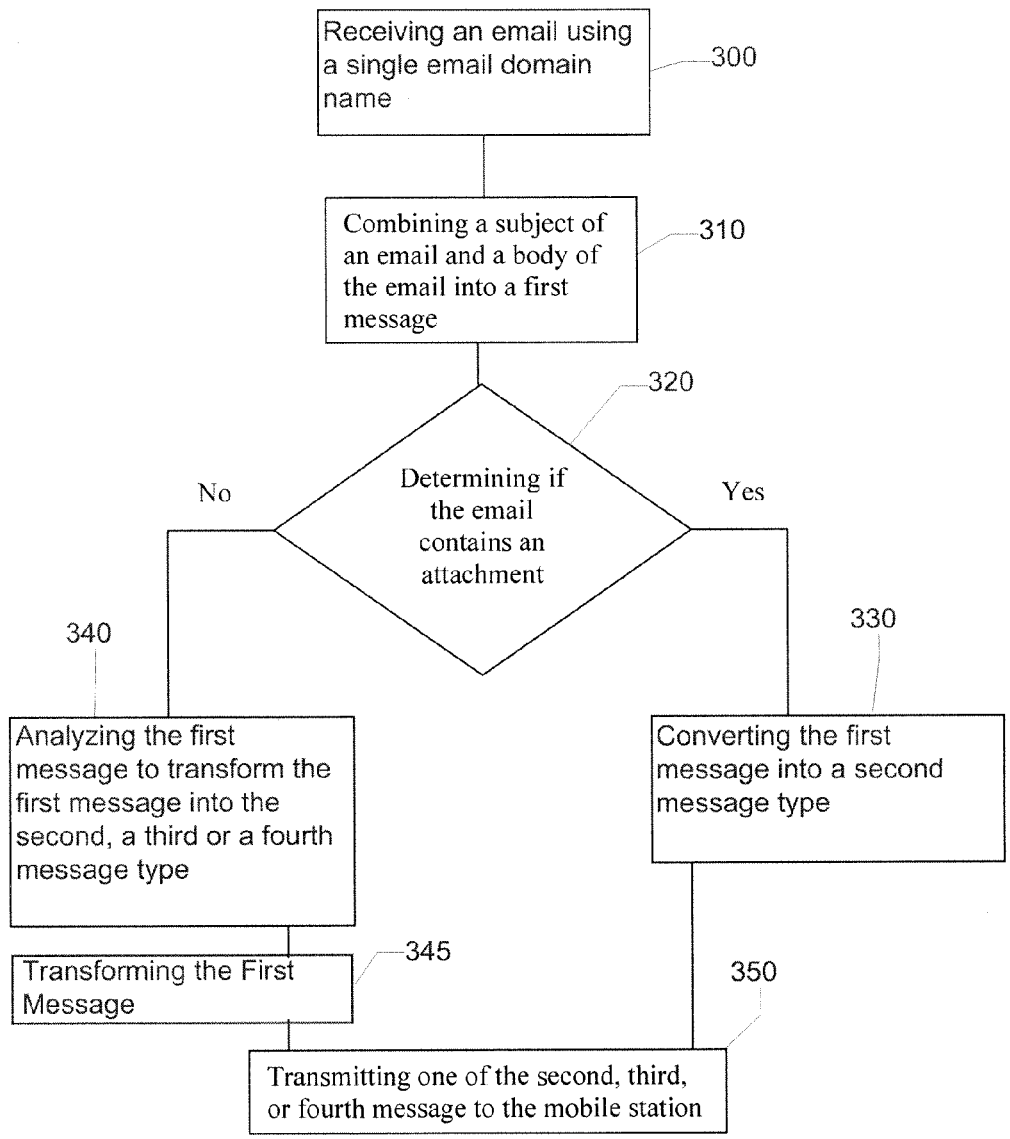
FIGS. 3A and 3B are flow diagrams describing an example of the processing of messages by the intelligent messaging system.
Figure 3B:
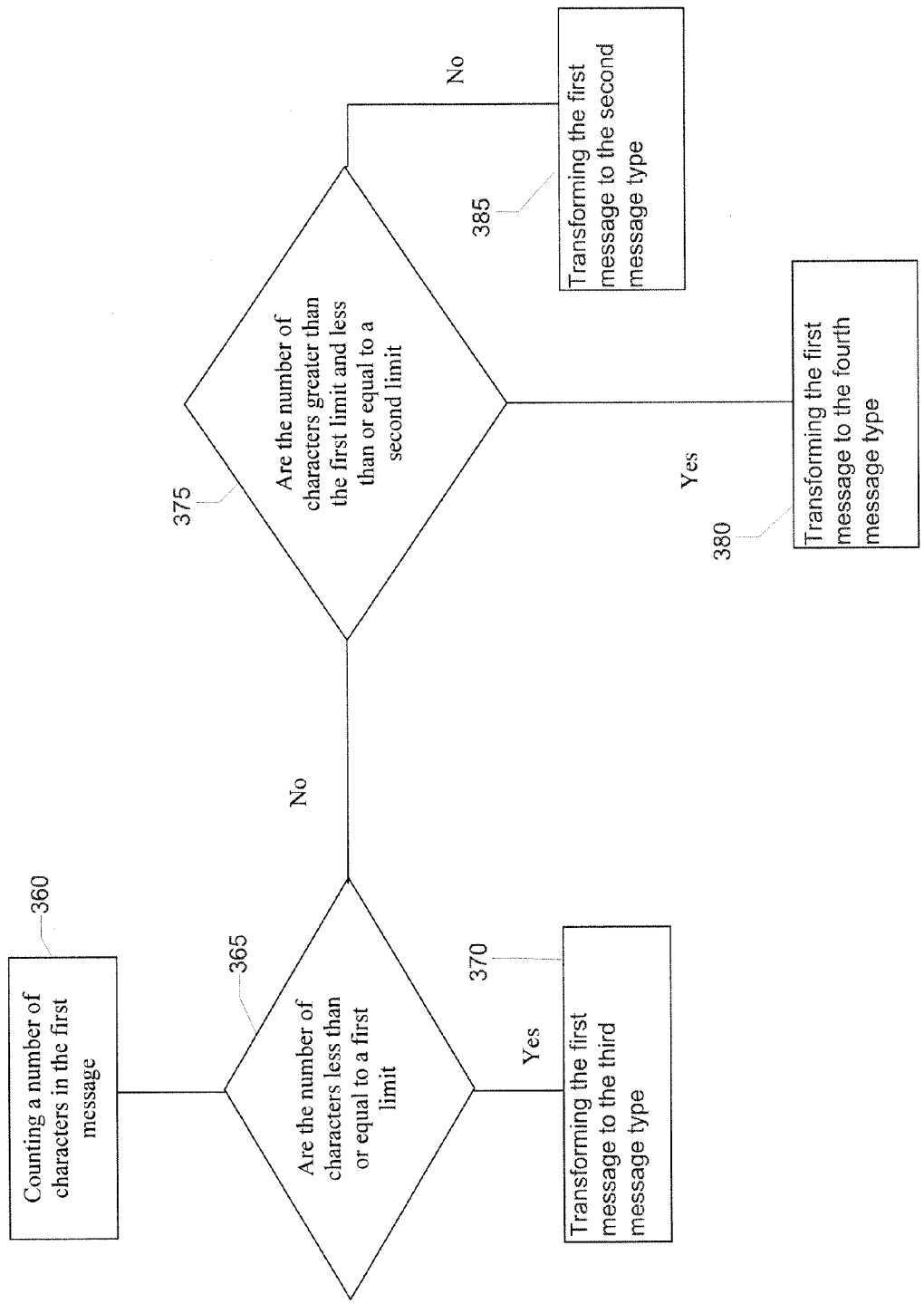

FIG. 3A and FIG. 3B illustrate an example of a method of determining a messaging protocol for the mobile station 250. FIG. 3A illustrates the handling an email having an attachment. The intelligent messaging system 205 receives an email sent from the email server 204 using a single email domain name (step 300), i.e. MDN@message.com. Typical emails have a subject line and a message body. The intelligent messaging system 205 combines the text of the subject line with the text of the body into a first message (step 310). In another embodiment, the message can also include the sender's email address and a callback number. The intelligent messaging system 205 then determines if the email contains an attachment (step 320). The attachment can be any type of file, picture, video, text, ring tone, wallpaper, application, etc. and any size. If the email contains the attachment, the first message is converted into a second message type having a first protocol (step 330). If the email does not contain the attachment, the first message is analyzed to select into which of different types of messages to transform the first message, the second message type, a third message type or a fourth message type (step 340). The first message is then transformed into the second, third, or fourth message type, having at least a second protocol, based on the analysis (step 345). Once the first message is converted to one of a second, third or fourth message type, the second, third or fourth message type is transmitted to the mobile station (step 350).

In relation to the system illustrated in FIG. 2, the intelligent messaging system 205 is performing most of the steps above (300, 310, 320) but one of ordinary skill can distribute the tasks across multiple systems. Once the determination is made, the intelligent messaging system 205 communicates with either the MMSC 206 or the SMSC 220. The communication is in MM3 or MM7 protocol for the first message that is converted to a MMS message. The communication is in SMPP protocol for the first message that is converted to a SMS or EMS message. The MMSC 206 and SMSC 220 make the final conversion to the particular type or format of the message (steps 330, 340). Once in the particular respective format, the MMSC 206 or the SMSC 220 transmit the message to the BSC 260/MSC 230 to be transmitted to the receiving mobile station 250.

FIG. 3B illustrates the method to handle messages that do not have an attachment as indicated in FIG. 3A by step 340. This is one example of the analysis the intelligent messaging system 205 is performing. The intelligent messaging system 205, after determining in step 320 that the email does not have an attachment, counts the number of characters in the first message (step 360). If the number of characters is less than or equal to a first limit (step 365), the first message is converted to a third message type having a second protocol (step 370). In an example the first limit can be between 140 and 160 characters. If the message is, for example, 130 characters (this is the total of the combination of the subject text and the body text of the email that was converted), the system converts the message to a SMS message with a SMS protocol.

If the number of characters is greater than the first limit and less than or equal to a second limit (step 375), the first message is converted to a fourth message type having a third protocol (step 380). As above, the first limit can be between 140 and 160 characters while the second limit can be approximately 1000 characters. If the character count comes between these values, the message can be converted to an EMS message, having an EMS protocol. As noted above, EMS messages are also handled by the systems that handle SMS messages.

If the message's number of characters is greater than the second limit (e.g. approximately 1000 characters), the first message is converted to the second message type having the first protocol (step 385). Thus, the method performs a first conversion of the email to a common format (for example, MM3 or MM7 format for MMS message), analyzes the message for attachments and character count, and determines the most efficient of the at least 3 messaging protocols to send the message. In this manner, users are assured that they receive the entire message (no character truncation as is common in SMS messaging or missing attachments) for the lowest price. Additionally, the cellular network provider is using his limited resources more efficiently by only sending messages that require the greater resources by the greater resource consuming method.

A further example is an article of manufacture that includes at least one machine readable storage medium having programming instructions embodied thereon. The instructions are for execution by one or more computers, wherein the programming configures the computers to be capable of performing functions for messaging services in a system. The functions performed by the programming instructions are similar to the steps above and illustrated in FIGS. 3A, 3B, and 4.

Figure 4:
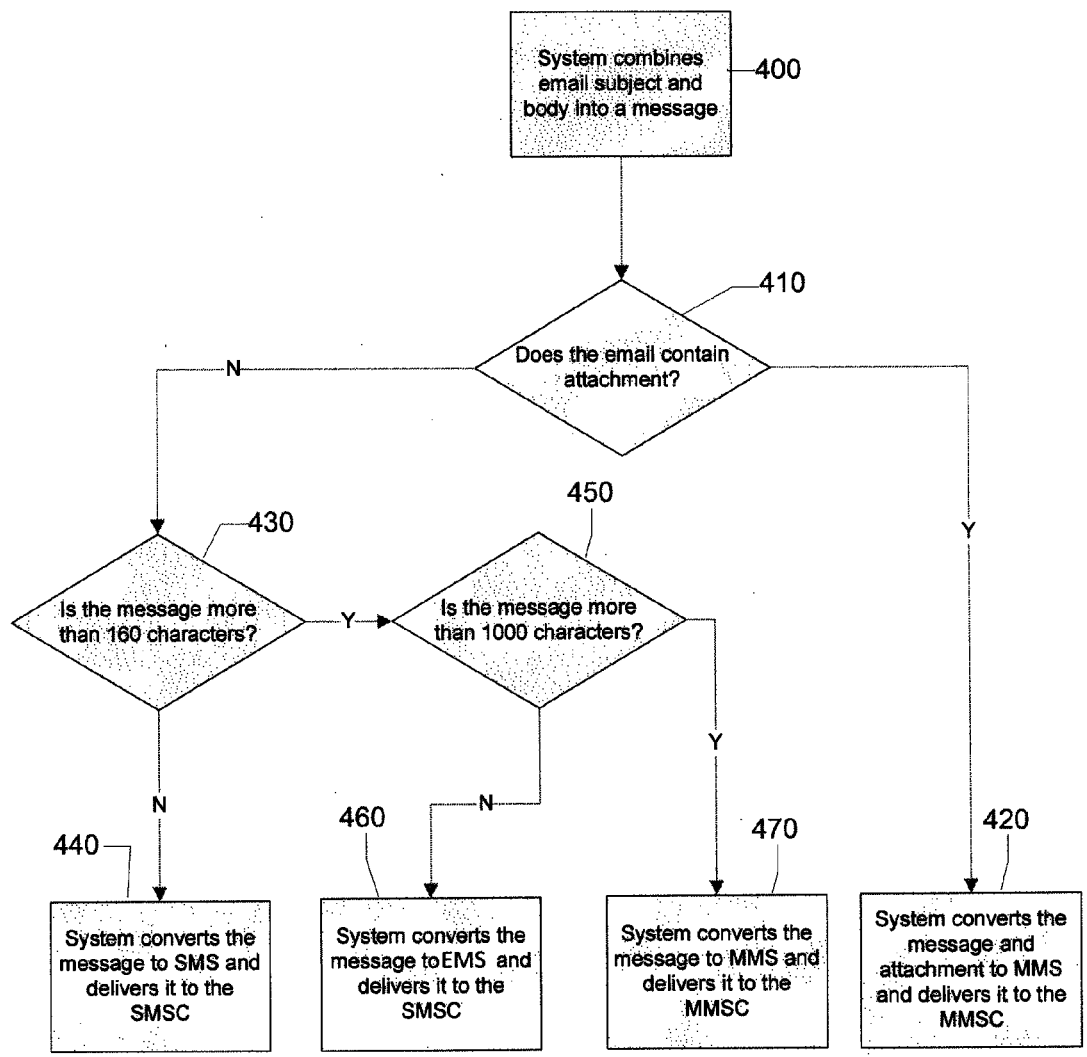
FIG. 4 is a flow diagram describing another example of the processing of messages by the intelligent messaging system.

FIG. 4 illustrates another example of how the intelligent messaging system 205 analyzes an incoming email to determine what type of message protocol should be used. The intelligent messaging system 205 receives the email and combines the subject line of the email with the body of the email and coverts it into a message (step 400). The intelligent messaging system 205 then determines if the email contains an attachment (step 410). If the email does contain an attachment, the message and the attachment are converted to the MMS protocol (e.g. MM3 or MM7) and sends the MMS message to the MMSC 206 (step 420).

If the intelligent messaging system 205 determines that the message does not contain an attachment (step 410) it then counts the number of characters. The intelligent messaging system 205 first checks if the message has more than 160 characters, or whatever limit for SMS messaging is set (step 430). If the message has less than, or equal to, 160 characters, the system converts the message into a message having the SMS protocol and transmits it to the SMSC 220 (step 440). If the message has more that 160 characters, the intelligent messaging system 205 determines if the message has more than 1000 characters (step 450). If the message is equal to or less than 1000 characters, then the intelligent messaging system 205 converts the message into an EMS message and transmits the EMS message to the SMSC 220 (step 460). If the message is more than 1000 characters, the message is converted into a message having the MMS protocol and is sent to the MMSC 206 (step 470).

To perform the character count, in one example, the intelligent messaging system 205 opens the message and counts all characters, including letters, numbers, spaces, and symbols.

Figure 5:
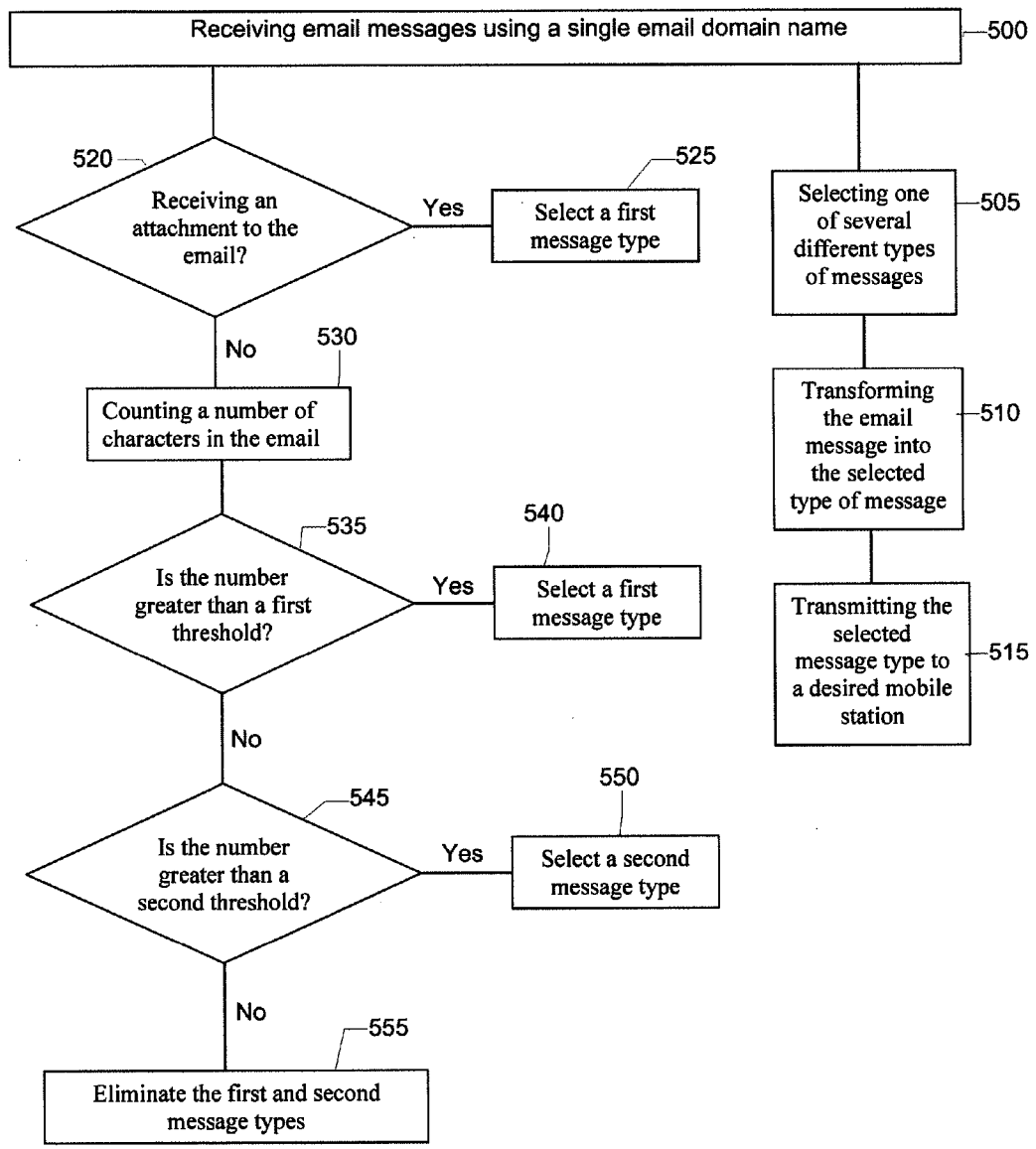
FIG. 5 is a flow diagram describing a further example of the processing of messages by the intelligent messaging system.

FIG. 5 illustrates yet another example of a method of delivering messages sent to a single email domain name. The steps of the method include receiving, at a server, email messages using a single email domain name (step 500) and selecting one of several different types of messages (step 505). In this example, each type of message differs from the other types of messages, (e.g. SMS, EMS, MMS, etc.). The email message can then be transformed into the selected type of message (step 510). Once transformed, the selected message type can be transmitted to a desired mobile station through a message server dependent on the selected type of message (step 515).

In another facet of the example, along with receiving an email message, an attachment to the email can optionally be received (step 520). If the attachment is received, a first message type can be selected (step 525). Alternately, if the attachment is not received, a number of characters in the email message can be counted (step 530). As a result of the count, it is determined if the number of characters is over a first threshold (step 535), and if so, the first message type can be selected (step 540). However, if the number is equal to or less then the first threshold it is then determined if the number of characters is greater than a second threshold (step 545). If the number is greater than the second threshold, a second message type is selected (step 550) and if the number is less than or equal to the second threshold, the first and second message types are eliminated from the selection process (step 555).

A further example of the selecting step can include determining the selected message type based on at least one of a number of factors. Factors can be based solely on whether the email message contains an attachment and, if the attachment is not received, a number of characters in the email message. In another example, one of the factors can be the minimum amount of bandwidth required for transmitting the message while fully delivering the selected message. Another is the maximum amount of efficiency for transforming the email into the selected message, while fully delivering the selected message.

Similar to the above, the first threshold can be approximately 1000 characters and the second threshold is between 140 and 160 characters. Also, the first message type can be a MMS message and the second message type can be an EMS message.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the intelligent messaging system. The software code is executable by the general-purpose computer that functions as a web server, application server(s) and/or SMSCs, MMSCs, SMPP GWs, PDSNs, etc. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to analyze messages and create SMS, EMS or MMS messages, in essentially the manner performed in the implementations discussed and illustrated herein.

A wireless mobile communication network between the mobile station 250 and the BSC 260 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 150/250 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

Figure 6:
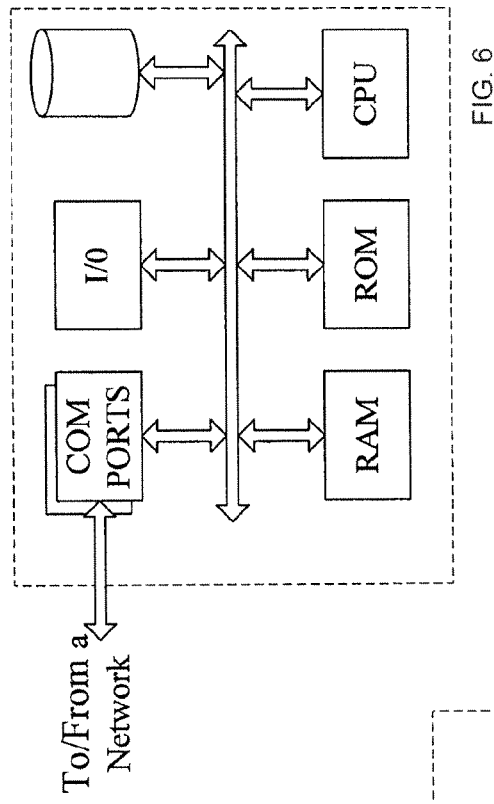
FIG. 6 is a simplified functional block diagram of a computer that may be configured as a host or server, for example, to function as any of the servers in the system of FIGS. 1 and 2.
Figure 7:
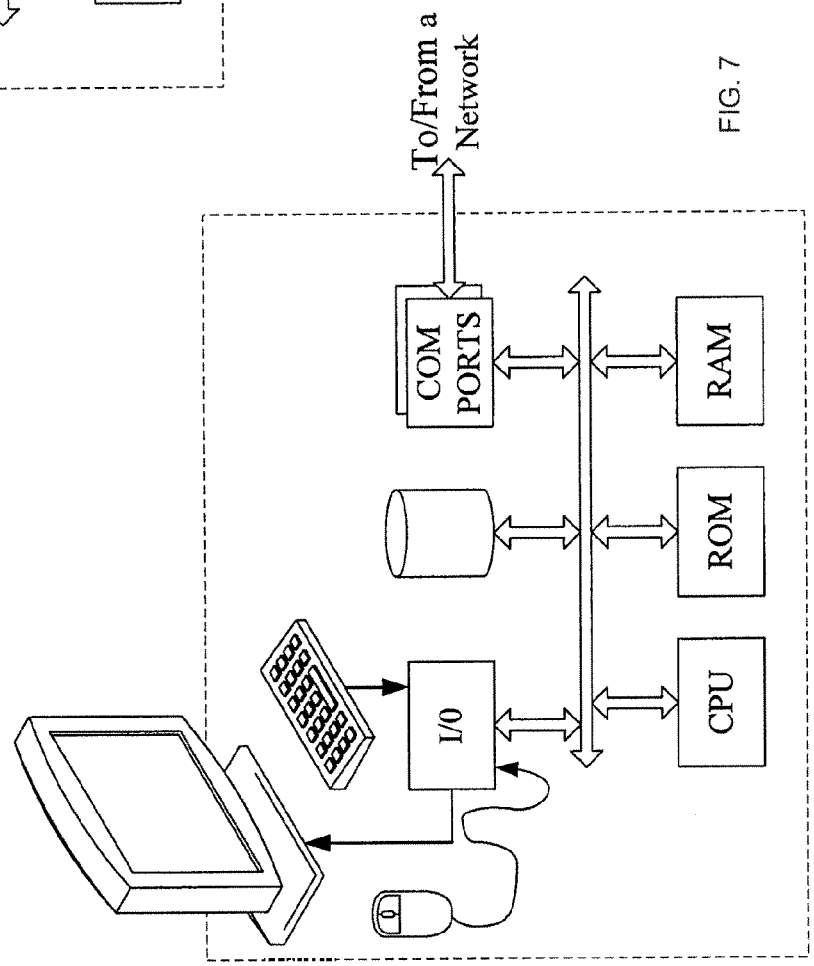
FIG. 7 is a simplified functional block diagram of a personal computer or other work station or terminal device, such as that having an email thereon.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load Hence, aspects of the methods of generating SMS, EMS, and MMS messages, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable the transmission of the email message. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of determining a message type for a mobile station, comprising the steps of:
    combining, at an intelligent messaging system, a subject of an email and a body of the email into a first message;
    determining, at the intelligent messaging system, if the email contains an attachment;
    if the email contains the attachment, converting, at the intelligent messaging system, the first message into a second message type;
    if the email does not contain the attachment, analyzing, at the intelligent messaging system, the first message to select into which of different types of messages to transform the first message: the second message type, a third message type, or a fourth message type; and transforming the first message into the second, the third, or the fourth message type based on the analyzing step,
wherein the steps of analyzing and transforming the first message comprise the steps of:
counting a number of characters in the first message;
if the number of characters is less than or equal to a first limit, transforming the first message to the third message type;
if the number of characters is greater than the first limit and less than or equal to a second limit, transforming the first message to the fourth message type; and
if the number of characters is greater than the second limit, transforming the first message to the second message type.

2. The method of claim 1, further comprising the step of receiving the email at the intelligent messaging system using a single email domain name.

3. The method of claim 1, further comprising the step of transmitting one of the second, third, or fourth message type to the mobile station.

4. The method of claim 1, wherein the second message type is a MMS message.

5. The method of claim 1, wherein:
the second message type is a MMS message;
the third message type is a SMS message; and
the fourth message type is an EMS message.

6. The method of claim 1, wherein:
the first limit is between 140 and 160 characters; and
the second limit is approximately 1000 characters.

7. An article of manufacture, comprising:
at least one machine readable non-transitory storage medium; and
programming instructions embodied in said at least one medium for execution by one or more computers, wherein the programming configures said one or more computers to be capable of performing functions for messaging services, the functions comprising:
combining a subject of an email and a body of the email into a first message;
determining if the email contains an attachment;
if the email contains the attachment, converting the first message into a second message type;
if the email does not contain the attachment, analyzing the first message to select into which of different types of messages to transform the first message: the second message type, a third message type, or a fourth message type; and
transforming the first message into the second, the third, or the fourth message type based on the analyzing step,
wherein the functions of the programming instructions analyzing and transforming the first message comprise:
counting a number of characters in the first message;
if the number of characters is less than or equal to a first limit, transforming the first message to the third message type;
if the number of characters is greater than the first limit and less than or equal to a second limit, transforming the first message to the fourth message type; and
if the number of characters is greater than the second limit, transforming the first message to the second message type.

8. The article of claim 7, wherein the functions of the programming instructions further comprise receiving the email at the intelligent messaging system using a single email domain name.

9. The article of claim 7, wherein the functions of the programming instructions comprise:
transmitting one of the second, third, or fourth message types to the mobile station.

10. The article of claim 7, wherein the second message type is a MMS message.

11. The article of claim 7, wherein
the second message type is a MMS message;
the third message type is a SMS message; and
the fourth message type is an EMS message.

12. The article of claim 7, wherein
the first limit is between 140 and 160 characters; and
the second limit is approximately 1000 characters.

13. A method of sending a message to a mobile station using a common email domain name, comprising the steps of:
receiving, at an intelligent messaging system, an email containing a subject and a body;
combining, at the intelligent messaging system, the subject and the body of the email into a first message;
determining, at the intelligent messaging system, if the email contains an attachment;
if the email contains the attachment, converting the first message into a Multimedia Message Service (MMS) message; and
if the email does not contain the attachment, counting a number of characters in the first message;
if the number of characters is less than or equal to 160 characters, converting the first message to a Short Messaging Service (SMS) message;
if the number of characters is greater than 160 characters and less than or equal to 1000 characters, converting the first message to an Enhanced Messaging Service (EMS) message; and
if the number of characters is greater than 1000 characters, converting the first message to the MMS message; and
sending the one of the MMS, SMS, or EMS message to the mobile station.

14. A method of delivering email messages sent to a single email domain name comprising the steps of:
receiving, at a server, one of the email messages sent to the single email domain name;
selecting, at the server, one of several different types of messages, wherein each type of message differs from the other types of messages;
optionally receiving, at the server, an attachment to the email message;
if the attachment is received, selecting a first message type;
if the attachment is not received, counting a number of characters in the email message;
if the number is over a first threshold, selecting the first message type;
if the number is equal to or less than the first threshold and greater than a second threshold, selecting a second message type,
if the number is less than or equal to the second threshold, eliminating the first and second message types;
transforming the email message into the selected type of message, and
transmitting the selected message type to a desired mobile station through a message server dependent on the selected type of message.

15. The method of claim 14, wherein
the first threshold is approximately 1000 characters; and
the second threshold is between 140 and 160 characters.

16. The method of claim 14, wherein
the first message type is a MMS message; and
the second message type is an EMS message.

17. The method of claim 14, wherein the selecting step comprises the step of determining the selected message type based on at least one of:
- a minimum amount of bandwidth required for the transmitting step, while fully delivering the selected type of message; and
- a maximum amount of efficiency for the transforming step, while fully delivering the selected type of message.

18. The method of claim 14, wherein the selecting step comprises the step of determining the selected message type based solely on whether the email message contains an attachment and, if the attachment is not received, a number of characters in the email message.

19. A method comprising, at an intelligent messaging system:
- combining a subject of an email and a body of the email into a first message;
- determining, based on whether the email contains an attachment, a set of message types into which to convert the first message from different sets of message types, the set of message types for an email that contains an attachment having a plurality of message types;
- when the email is determined not to contain an attachment, counting a number of characters in the first message and selecting one message type among the plurality of message types based on the number of characters; and
- converting the first message into the selected message type
- wherein the plurality of message types comprises at least three message types, to each of which a different non-overlapping range of numbers of characters is mapped,
- wherein a first of the message types is mapped to a first range of at most 140 and 160 characters, a second of the message types is mapped to a second range of greater than 140 and 160 characters and at most approximately 1000 characters, and a third of the message types is mapped to a third range of greater than approximately 1000 characters.

20. The method of claim 19, wherein the set of message types for an email that does contain an attachment has a single message type, the method further comprising converting the first message into the single message type when the email is determined not to contain an attachment.

* * * * *